(12) United States Patent
Ruff et al.

(10) Patent No.: US 7,094,070 B1
(45) Date of Patent: Aug. 22, 2006

(54) APPARATUS AND METHOD FOR A CONNECTOR HAVING A DATA MODULE

(75) Inventors: Brian F. Ruff, Lee's Summit, MO (US); Walter J. Rolston, Overland Park, KS (US); Sheldon T. Wheaton, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 10/284,865

(22) Filed: Oct. 30, 2002

(51) Int. Cl.
*H01R 12/00* (2006.01)

(52) U.S. Cl. .................................... 439/76.1

(58) Field of Classification Search ........ 439/607–610, 439/98, 76.1; 361/676
See application file for complete search history.

(56) References Cited

U.S. PATENT DOCUMENTS

| 4,130,334 | A |   | 12/1978 | Anderson ................. 339/103 |
| H379 | H |   | 12/1987 | Alexander, Jr. ........... 439/610 |
| 4,900,261 | A |   | 2/1990 | Gentry et al. ............. 439/353 |
| 4,921,441 | A |   | 5/1990 | Sauder ..................... 439/460 |
| 4,973,259 | A |   | 11/1990 | Sachs ...................... 439/98 |
| 5,052,947 | A |   | 10/1991 | Brodie et al. ............. 439/607 |
| 5,304,964 | A |   | 4/1994 | DiMarco ................... 333/181 |
| 5,315,063 | A |   | 5/1994 | Auclair .................... 174/78 |
| 5,372,513 | A |   | 12/1994 | Rodrigues et al. .......... 439/98 |
| 5,587,904 | A | * | 12/1996 | Ben-Yair et al. ........... 701/213 |
| 5,775,924 | A |   | 7/1998 | Miskin et al. ............. 439/98 |
| 5,820,412 | A |   | 10/1998 | Koegel et al. ............. 439/610 |
| 5,827,078 | A |   | 10/1998 | Simonian .................. 439/95 |
| 6,017,245 | A |   | 1/2000 | Karir ....................... 439/610 |
| 6,625,016 | B1 | * | 9/2003 | Glusing et al. ............ 361/686 |
| 2003/0002562 | A1 | * | 1/2003 | Yerlikaya et al. .......... 374/208 |
| 2003/0156397 | A1 | * | 8/2003 | Preissl et al. ............. 361/776 |

OTHER PUBLICATIONS

Inotec Electronics Catalog—www.inotec-electronics.com, pp. 1-32 and additional miscellaneous pages fom website, no date.

* cited by examiner

*Primary Examiner*—J. F. Duverne
(74) *Attorney, Agent, or Firm*—David L. Terrell

(57) ABSTRACT

An improved device and method for a transmission line connector is shown. The transmission line connector includes a memory device. In one embodiment, the memory device allows the storage of parameters for use with an electronic module. In one embodiment, the location of the memory device allows a user to replace a broken module with a second module and upload any parameters stored in the memory device without having to manually re-enter the parameters from the new module.

10 Claims, 3 Drawing Sheets

APPARATUS AND METHOD FOR A CONNECTOR HAVING A DATA MODULE

FIELD OF THE INVENTION

Embodiments of the invention relate generally to apparatus and methods for connecting optical, radio frequency (RF), direct current, and other conductors. More particularly, embodiments of the invention relate to apparatus and methods for connecting electronic modules to optical, radio frequency (RF), direct current, and other conductors.

BACKGROUND OF THE INVENTION

Optical, RF, and direct current conductors are often terminated using connector inserts and/or terminals. Such inserts, in turn, are assembled into connectors and provide a convenient interface to power, data, and other forms of energy communicated between various physical locations. The custom of using connectors has given rise to a large industry, and many different types of connectors, designed to accommodate particular circumstances, have become available.

Thus, even those connectors which at first glance appear to be similar can usually be differentiated by any number of user-selectable features. For example, features which can be chosen for most connectors include multiple pin/socket configurations, the use or absence of cable strain relief, and a variety of housing materials (e.g., metal and plastic). Other, more specialized, features made available for some connector types include those enabling efficient assembly, such as crimp-on pins or sockets, and split-housing assemblies.

Connector pricing is competitive, and connectors which can be made in a relatively inexpensive manner, while providing a mix of general and specialized features, are valuable to both vendors and consumers. Thus, there is a need to lower up-front connector costs while increasing the number of user-selectable options. Connector features which enable rapid assembly and repair are especially desirable, since these operations affect the long-term cost of connectors.

SUMMARY OF THE INVENTION

The above mentioned problems such as increasing the number of user-selectable options and enabling rapid assembly and repair are addressed by the present invention and will be understood by reading and studying the following specification.

A transmission line connector is provided. The transmission line connector includes a connector housing and a number of terminal connectors attached to the connector housing. The number of terminal connectors are adapted for attachment of a number of transmission lines. The transmission line connector also includes a memory device located on the connector housing and coupled to a number of the terminal connectors.

An avionic system is also shown. The avionic system includes at least one avionic module having a module connector portion coupled to the avionic module by a first number of transmission lines. The avionic system also includes a mounting frame connector portion adapted to interface with the module connector portion. The avionic system includes a second number of transmission lines attached to the mounting frame connector portion. The avionic system also includes a memory device located on the mounting frame connector portion wherein at least one avionic module parameter is stored in the memory device.

A method of replacing an electronic module is also shown. The method includes detaching a first module portion of a transmission line connector from a mounting frame portion of the transmission line connector, the first module portion being coupled to a first electronic module. The method also includes attaching a second module portion to the mounting frame portion, the second module portion being coupled to a second electronic module. The method also includes accessing data from a memory device located on the mounting frame portion, and setting at least one parameter in the second electronic module with the data from the memory device.

A method of manufacturing a transmission line connector is also shown. The method includes forming a connector housing and attaching a number of terminal connectors to the connector housing. The number of terminal connectors are adapted for attachment of a number of transmission lines. The method also includes attaching a memory device to the connector housing and coupling the data memory device to a selected number of the terminal connectors.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

Figure 1A:
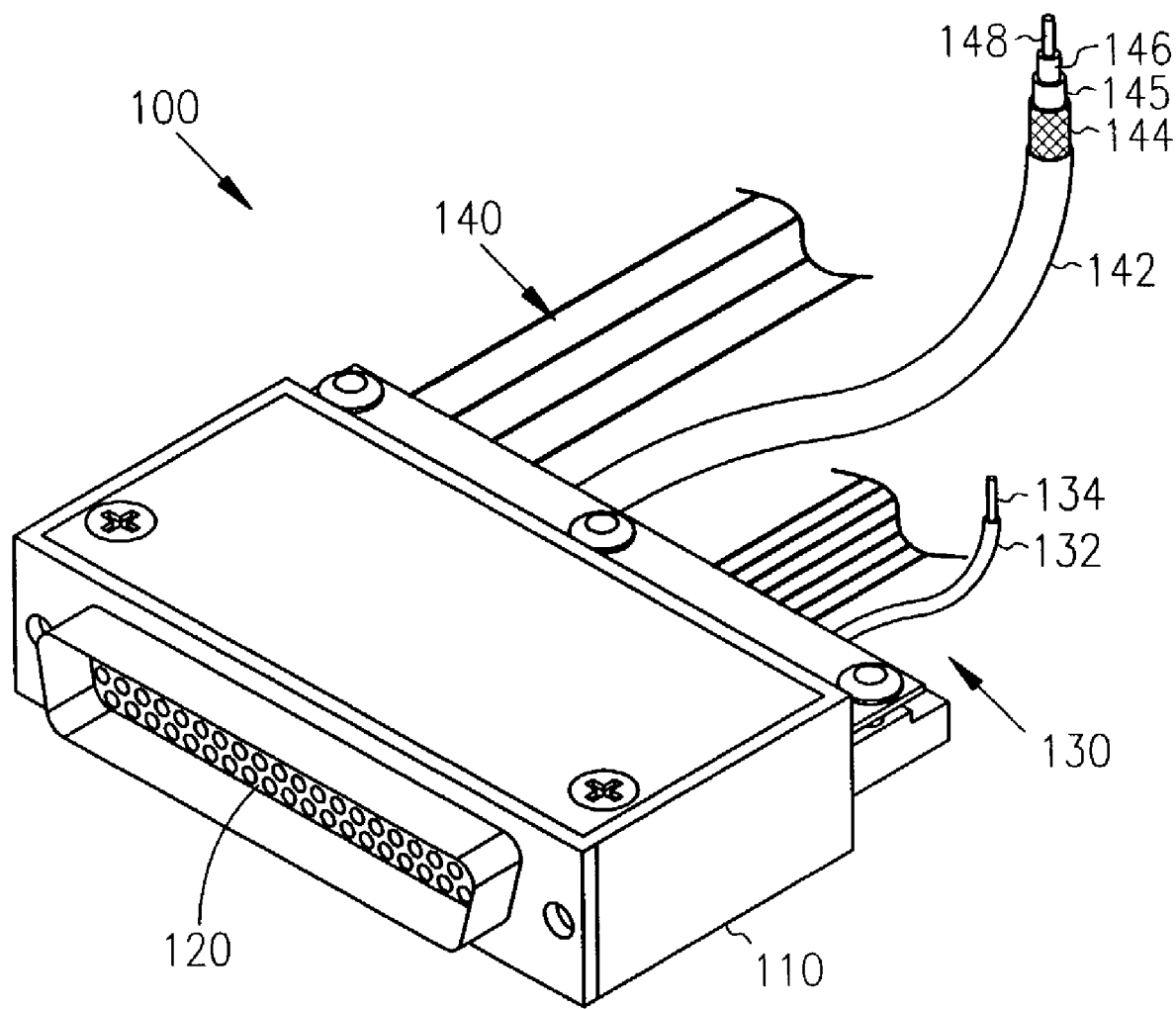
FIG. 1A shows an assembled perspective view of an apparatus according to an embodiment of the invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

In one embodiment, the apparatus and method of the invention related to connectors are used to terminate conductors used in an aircraft, and the resulting apparatus are coupled to avionic modules mounted within the aircraft, such as navigation and communications equipment. Although this setting is used as an example, the apparatus and methods described herein can be used in other settings without departing from the scope of this disclosure, and embodiments of the invention are not so limited.

FIG. 1A shows a transmission line connector 100. The transmission line connector includes a number of terminal connectors 120 coupled to a first number of transmission lines 130 and a second number of transmission lines 140. FIG. 1A shows a male D-sub connector without pins, although the invention is not so limited. Other types of connectors such as a number of female pin connectors, a number of male or female card edge connectors, or other connector types are within the scope of the invention.

In one embodiment, the first number of transmission lines 130 includes a number of electrical transmission lines. Other possible transmission lines include, but are not limited to, optical transmission lines and RF signal transmission lines. In one embodiment, the first number of transmission lines 130 includes a first number of unshielded transmission lines. In one embodiment, the unshielded transmission lines include a conductor portion 134 and an insulator portion 132.

In one embodiment, the second number of transmission lines 140 includes a number of electrical transmission lines. Similar to the first number of transmission lines 130, other possible transmission lines include, but are not limited to, optical transmission lines and RF signal transmission lines. In one embodiment, the second number of transmission lines 140 includes a second number of shielded transmission lines. In one embodiment, the shielded transmission lines include a conductor portion 148, a first insulator portion 146, a shield portion 144 and an outer insulator portion 142. In one embodiment a second insulator portion 145 is included between the first insulator portion 146 and the shield portion 144. In one embodiment, the shield portion 144 includes a metallic mesh. Other shield portions include, but are not limited to wrapped foil, or other shielding materials. In one embodiment, the shields from the second number of transmission lines 140 are grounded to the connector housing 110.

Figure 1B:
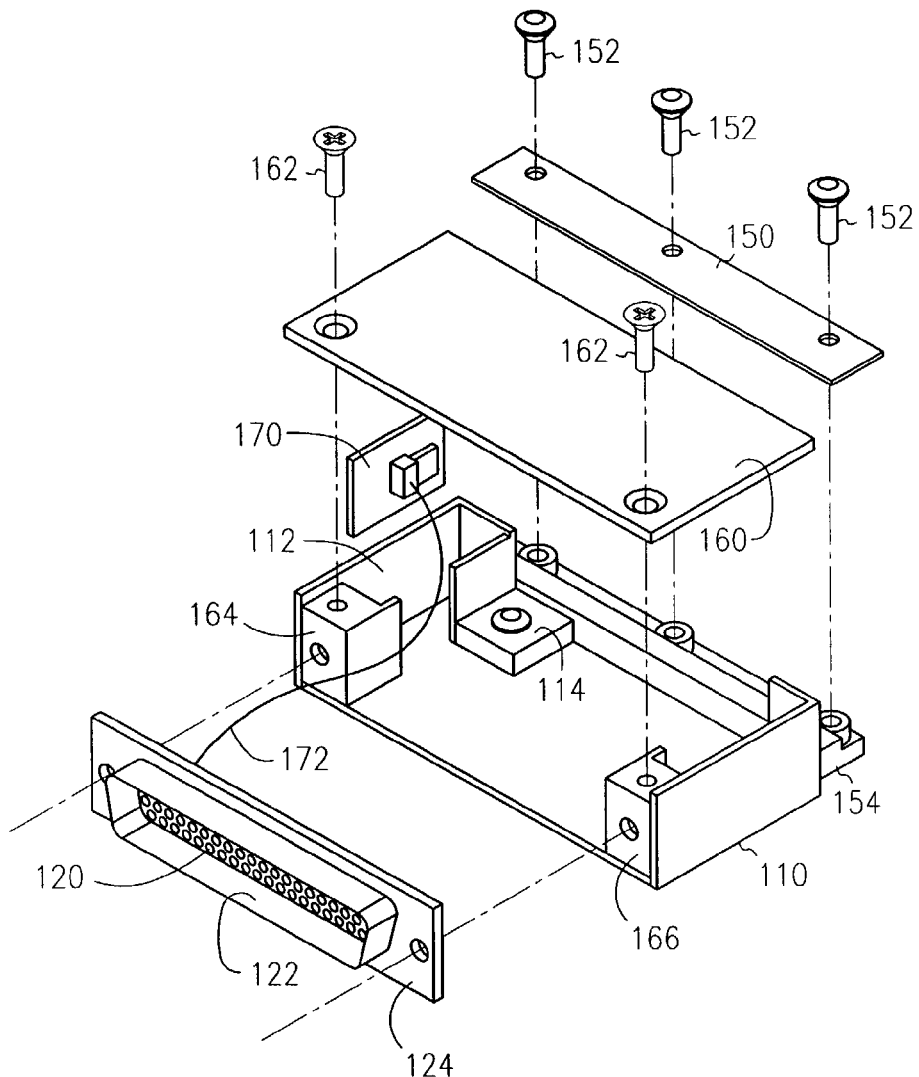
FIG. 1B shows an exploded perspective view of an apparatus, according an embodiment of the invention.

FIG. 1B shows an exploded view of an embodiment of the transmission line connector 100. A connector housing 110 is shown with the number of terminal connectors 120. In one embodiment, the number of terminal connectors 120 are coupled to a terminal plate 124. In one embodiment, the number of terminal connectors 120 are further contained within a shaped housing 122 such as a D-shaped housing. Other forms of shaped housing 122 are also within the scope of the invention. In one embodiment, the shaped housing 122 and the terminal plate 124 are integrally formed. In one embodiment, the terminal plate 124 is fastened to the connector housing 110 using a number of fasteners (not shown). In one embodiment, the number of fasteners includes a number of screws, although other fasteners are also acceptable. In one embodiment, the terminal plate is secured to a first mating region 164 and a second mating region 166. In one embodiment, the number of terminal connectors 120 are attached to an integrally formed region of a connector housing 110 without the use of a terminal plate 124.

A cover plate 160 is further shown in FIG. 1B. The cover plate 160 is secured to the connector housing 110 using a number of fasteners 162. In one embodiment, the number of fasteners 162 include a number of screws. Other methods and devices for enclosing a connector housing 110 are also contemplated within the scope of the invention. Snaps or bayonet fasteners are possible in one embodiment. In one embodiment, elements such as the number of terminal connectors 120 are encased in a molded connector housing 110. One advantage of a removable cover plate 160 includes the ability to service internal components in the connector housing 110. Likewise, removability of individual components allows for their possible repair and replacement.

A transmission line retaining device 150 is further shown. In one embodiment a number of fasteners 152 are used to secure the retaining device to a mating portion 154. In one embodiment, the number of fasteners 152 include a number of screws. In one embodiment, a number of transmission lines are passed between the mating portion 154, and the retaining device 150. The retaining device 150 is then clamped onto the number of transmission lines using the number of fasteners 152.

Also shown in FIG. 1B is a circuit module 170. In one embodiment, the circuit module 170 is located in a formed recess 112 of the connector housing 110. The recess 112 serves to securely contain the circuit module within the connector housing. In one embodiment, a transmission line 172 is coupled between the circuit module 170 and selected terminal connectors of the number of terminal connectors 120. In one embodiment, a mounting feature 114 is included within the connector housing 110. One embodiment of a mounting feature 114 includes a threaded hole in combination with a mating screw or bolt. In one embodiment, the mounting feature 114 is configured to accept a device such as a sensor. The mounting feature 114 is located adjacent to the recess 112 for convenient coupling of a device to the circuit module.

Figure 2:
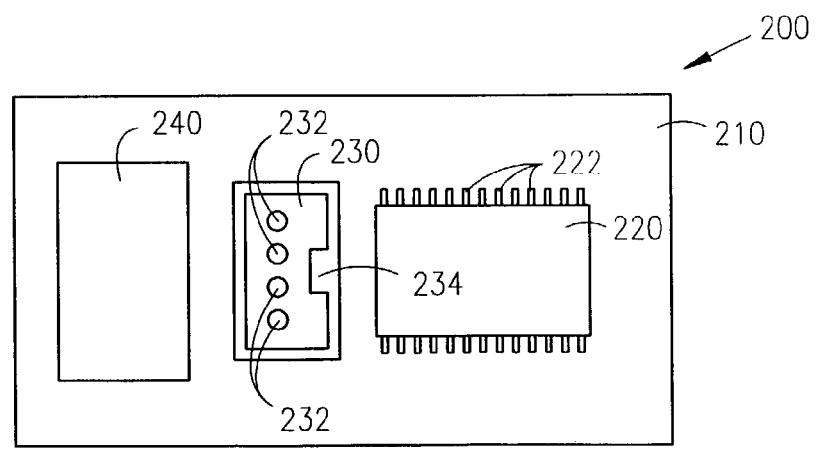
FIG. 2 shows a top view of a circuit module according to an embodiment of the invention.

FIG. 2 shows a circuit module 200. Embodiments of the circuit module 200 may be used in embodiments of the transmission line connector 100 as described above. In one embodiment, the circuit module 200 is used in place of the circuit module 170 as described in FIG. 1B. An embodiment of a circuit module 200 shown in FIG. 2 includes a printed circuit board 210 with a memory device 220 attached to the printed circuit board 210. Although a single memory device 220 is shown, multiple memory devices are also within the scope of the invention. In one embodiment, a connector 230 is included on the printed circuit board 210. The connector 230 includes a number of terminal connectors 232 that are adapted to couple to transmission lines (not shown). In one embodiment, the connector 230 is adapted to couple transmission lines between selected terminal connectors of a transmission line connector as described above, and the circuit module 200. A keying feature 234 may also be included to orient a mating connector to the connector 230. In one embodiment, the connector 230 is coupled to the memory device 220 to facilitate input/output of data with the memory device 220.

In one embodiment, the memory device 220 includes a semiconductor chip contained in a package matrix. The memory device 220 from FIG. 2 includes a number of legs 222 for connection to circuitry on the printed circuit board 210. In one embodiment, the memory device includes a device such as a DRAM, SRAM, or similar device. In one embodiment, the memory device includes a non-volatile memory device. Non-volatile memory devices may include, but are not limited to Flash memory, EEPROM devices, etc.

In one embodiment, the circuit module 200 further includes additional circuitry 240. In one embodiment, the additional circuitry 240 includes a processor circuit. In one embodiment, the additional circuitry 240 includes an electro-static discharge (ESD) protection circuit. In one embodiment the additional circuitry includes a circuit adapted to process a signal from a device remote from the circuit module. In one embodiment, a remote device includes a temperature device, such as a thermocouple. In one embodiment, a temperature device is mounted to a mounting feature such as mounting feature 114 as shown in FIG. 1B, and the temperature sensing device transmits signals to the additional circuitry 240 for processing. In one embodiment, the additional circuitry 240 includes a local sensing device mounted on the printed circuit board 210 such as a temperature sensing device. In one embodiment, the additional circuitry includes a thermocouple.

Figure 3:
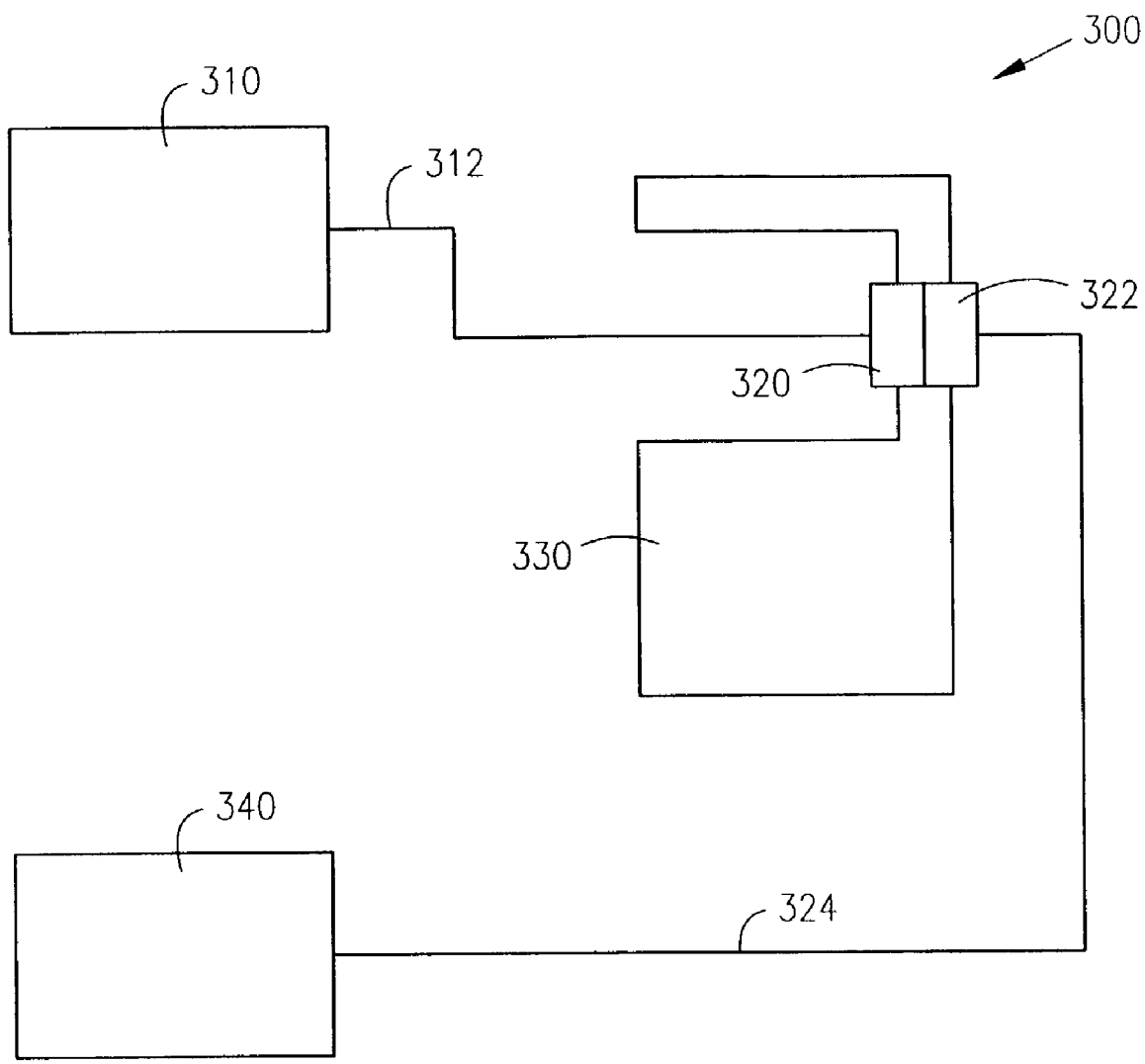
FIG. 3 shows a block diagram of an electronic system according to an embodiment of the invention.

FIG. 3 shows an electronic system 300. In one embodiment, the electronic system 300 includes an avionic system adapted for use in an aircraft. In one embodiment, the electronic system 300 includes a remote device 340, which in the example of an aircraft, may include remote circuitry or sensing equipment for devices such as a transponder, a global positioning system (GPS), a communications radio, a transceiver, a weather radio, an auto pilot, a navigation system, etc. The remote device 340 is shown coupled to a first portion of a transmission line connector 322 by at least one transmission line 324. The first portion of a transmission line connector 322, in an embodiment as illustrated in FIG. 3, is coupled to a mounting frame 330. In an avionic embodiment, the mounting frame 330 is located near an aircraft cockpit instrument panel.

An electronic module 310 is also shown in FIG. 3. In one embodiment, the electronic module 310 includes an avionic module. In one embodiment, the avionic module displays information and controls operation of the remote device 340. The electronic module 310 is shown coupled to a second portion of a transmission line connector 320 by at least one transmission line 312. FIG. 3 shows the transmission line 312 as extending outwards from a housing of the electronic module 310 and coupling with the second portion of a transmission line connector 320 external to the electronic module 310. In one embodiment, the transmission line 312 and the second portion of a transmission line connector 320 are integrated within a housing of the electronic module 310.

In one normal operating configuration, the electronic module 310 is removably coupled to the remote device 340 through transmission lines 312 and 324. The electronic module 310 is mounted to the mounting frame 330, for example in a cockpit instrument panel, with the mounting frame providing stability to the electronic module 310.

In one method of use, the electronic module 310 is installed by coupling the second portion of a transmission line connector 320 to the first portion of a transmission line connector 322 within the mounting frame 330. A user then accesses information from, and sends information to the remote device 340 as in normal use. Additionally, in one embodiment, the user sets at least one parameter that is specific to the user. In one embodiment, parameters are automatically set by the electronic module 310. In one embodiment, parameters are pre-set within the memory device. Examples of parameters include, but are not limited to: map orientations such as North up or track up; communications information such as last comm channel tuned; configuration information such as how many modules of each type are installed in an airframe; calibration data, such as orientation info for AHRS (Attitude and Heading Reference System) and static source corrections for Airdata. In one embodiment, multiple electronic modules 310 are coupled to a single connector 322. In one embodiment, parameters as described above for multiple electronic modules 310 are stored within the memory device.

Using embodiments as described above, the user is able to store parameters such as those listed above in a memory device that is coupled to a circuit module such as elements 220 and 200 respectively from FIG. 2. In one embodiment, the circuit module is located in the first portion of the transmission line connector 322 which is located on the mounting frame 330. The parameters are transmitted from the electronic module 310, through the second portion of the transmission line connector 320 to the first portion of the transmission line connector 322 in selected terminal connectors as described in embodiments above.

This configuration is advantageous, because if the electronic module 310 is replaced, the user defined parameters are stored external to the electronic module 310. Therefore, when a replacement electronic module is installed, the user defined parameters do not need to be re-set. The new electronic module is able to access the parameters and configure the replacement module to the preferred settings automatically, without any additional operations beyond unplugging the first module and plugging in the replacement module. This facilitates easier module replacement. Further, the use of a non-volatile memory is advantageous, because power is not needed to maintain the parameter data in the memory device.

CONCLUSION

Thus has been shown a transmission line connector including a memory device. In one embodiment, the memory device allows the storage of parameters for use with an electronic module. In one embodiment, the location of the memory device allows a user to replace a broken module with a second module and upload any parameters stored in the memory device without having to manually re-enter the parameters into the new module.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A method of replacing an electronic module, comprising:
   sending data from a first electronic module to a memory device located on a mounting frame portion of a transmission line connector;
   detaching a first module portion coupled to the first electronic module from the mounting frame portion of the transmission line connector;
   attaching a second module portion to the mounting frame portion, the second module portion being coupled to a replacement electronic module;
   accessing the data from the memory device; and
   setting at least one parameter in the replacement electronic module with the data from the memory device.

2. The method of claim 1, wherein the first electronic module and the replacement electronic module each include an avionic module.

3. The method of claim 1, wherein the first electronic module and the replacement electronic module each include a global positioning system (GPS) module.

4. The method of claim 1, wherein accessing data from a memory device includes accessing data from a non-volatile memory device.

5. The method of claim 1, wherein setting at least one parameter in the replacement module includes setting a user defined screen display parameter.

6. A method of replacing an electronic module, comprising:
- sending a user parameter from a first electronic module to a memory device located on a mounting frame connector;
- unplugging the first electronic module from the mounting frame connector;
- plugging in a second electronic module to the mounting frame connector; and
- setting at least one parameter in the second electronic module with the data from the memory device.

7. The method of claim 6, wherein the user parameter is selected from the group consisting of a preferred map orientation and communications information.

8. The method of claim 6, wherein the first electronic module and the second electronic module each include an avionic module.

9. The method of claim 6, wherein the first electronic module and the second electronic module each include a global positioning system (GPS) module.

10. The method of claim 6, wherein the memory device includes a non-volatile memory device.

* * * * *